(12) United States Patent  (10) Patent No.: US 8,817,112 B2
Hatanaka et al.  (45) Date of Patent: Aug. 26, 2014

(54) ELECTRONIC APPARATUS, CONTROL METHOD AND COMPUTER READABLE MEDIUM FOR TRANSMITTING THUMBNAIL DATA TO AN EXTERNAL APPARATUS

(75) Inventors: Koji Hatanaka, Yokohama (JP); Kenichiroh Hara, Yokohama (JP); Takashi Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 11/573,238

(22) PCT Filed: Sep. 14, 2005

(86) PCT No.: PCT/JP2005/017329
§ 371 (c)(1),
(2), (4) Date: Feb. 5, 2007

(87) PCT Pub. No.: WO2006/030958
PCT Pub. Date: Mar. 23, 2006

(65) Prior Publication Data
US 2007/0252896 A1   Nov. 1, 2007

(30) Foreign Application Priority Data
Sep. 15, 2004  (JP) .................................. 2004-268711

(51) Int. Cl.
*H04N 5/225* (2006.01)
*H04N 5/232* (2006.01)
(52) U.S. Cl.
USPC .................................... 348/207.1; 348/211.1
(58) Field of Classification Search
USPC ........ 348/231.1, 231.2, 231.3, 231.9, 207.11, 348/211.1, 211.3, 211.4, 211.6
See application file for complete search history.

(56) References Cited

U.S. PATENT DOCUMENTS 5,510,858 A   4/1996  Shido et al. .................... 348/718
5,528,293 A * 6/1996  Watanabe .................. 348/231.2
(Continued)

FOREIGN PATENT DOCUMENTS

JP  9-305473   11/1997
JP  9-330257   12/1997
(Continued)

OTHER PUBLICATIONS

Yano et al., Machine Translation of JP 2004254296, 20040909.*

(Continued)

*Primary Examiner* — Twyler Haskins
*Assistant Examiner* — Carramah J Quiett
(74) *Attorney, Agent, or Firm* — Fitzpatrick, Cella, Harper & Scinto

(57) ABSTRACT

An electronic apparatus, method, and computer-readable medium shorten the response time of an electronic apparatus such as an electronic camera capable of communicating with an information processing apparatus such as a computer, and improve the usability of the information processing apparatus when the information processing apparatus requests data stored in the storage medium of the electronic apparatus. The electronic apparatus, which has a main storage device and an auxiliary storage device, is connected to an external apparatus, and can transmit/receive data to/from the external apparatus. Data to be requested by the external apparatus is loaded in advance from the auxiliary storage device to the main storage device before the external apparatus requests the data after connection to the external apparatus is established.

8 Claims, 10 Drawing Sheets

(56) References Cited

U.S. PATENT DOCUMENTS

| | | | |
|---|---|---|---|
| 5,903,309 A * | 5/1999 | Anderson | 348/333.02 |
| 6,301,586 B1 * | 10/2001 | Yang et al. | 707/104.1 |
| 6,335,742 B1 * | 1/2002 | Takemoto | 715/781 |
| 6,452,629 B1 * | 9/2002 | Aizawa et al. | 348/231.99 |
| 6,567,119 B1 * | 5/2003 | Parulski et al. | 348/207.2 |
| 6,784,925 B1 | 8/2004 | Tomat et al. | |
| 6,914,625 B1 * | 7/2005 | Anderson et al. | 348/222.1 |
| 6,917,379 B1 * | 7/2005 | Ichihara | 348/207.1 |
| 7,012,636 B2 | 3/2006 | Hatanaka | 348/211.99 |
| 7,075,568 B2 | 7/2006 | Aizawa | 348/211.99 |
| 7,191,306 B2 * | 3/2007 | Myoung et al. | 711/203 |
| 7,466,357 B2 * | 12/2008 | Myojo | 348/333.05 |
| 7,525,571 B2 * | 4/2009 | Ando et al. | 348/207.1 |
| 2001/0052936 A1 * | 12/2001 | Nagai | 348/233 |
| 2002/0063781 A1 * | 5/2002 | Aizawa | 348/211 |
| 2003/0071903 A1 * | 4/2003 | Nakami | 348/221.1 |
| 2003/0115409 A1 | 6/2003 | Yamada et al. | 711/113 |
| 2003/0122940 A1 * | 7/2003 | Myojo | 348/231.2 |
| 2003/0210335 A1 * | 11/2003 | Carau et al. | 348/231.2 |
| 2003/0222985 A1 * | 12/2003 | Goto et al. | 348/207.2 |
| 2004/0056846 A1 | 3/2004 | Aizawa | 345/173 |
| 2004/0061783 A1 * | 4/2004 | Choi et al. | 348/207.1 |
| 2004/0085849 A1 * | 5/2004 | Myoung et al. | 365/232 |
| 2004/0090543 A1 * | 5/2004 | Suehiro | 348/231.99 |
| 2004/0109062 A1 | 6/2004 | Yamaya | 348/207.1 |
| 2004/0252335 A1 * | 12/2004 | Yano et al. | 358/1.15 |
| 2006/0017963 A1 * | 1/2006 | Sakuda et al. | 358/1.15 |
| 2006/0112413 A1 * | 5/2006 | Ando et al. | 725/105 |
| 2007/0252896 A1 | 11/2007 | Hatanaka et al. | 348/207.1 |
| 2008/0043110 A1 | 2/2008 | Aizawa | 348/211.2 |

FOREIGN PATENT DOCUMENTS

| | | |
|---|---|---|
| JP | 10-084473 | 3/1998 |
| JP | 11-219313 | 8/1999 |
| JP | 11-355706 | 12/1999 |
| JP | 2002-369106 | 12/2002 |
| JP | 2003-125190 | 4/2003 |
| JP | 2003-141813 | 5/2003 |
| JP | 2004-78837 | 3/2004 |
| JP | 2004-254296 A | 9/2004 |
| WO | 2004/030357 A1 | 4/2004 |

OTHER PUBLICATIONS

Japanese Office Action—Notification of Reasons for Refusal issued Feb. 18, 2008, in Japanese Application No. 2004-268711, and English-language translation thereof.

Japanese Action issued May 16, 2008, in Japanese Application No. 2004-268711.

* cited by examiner

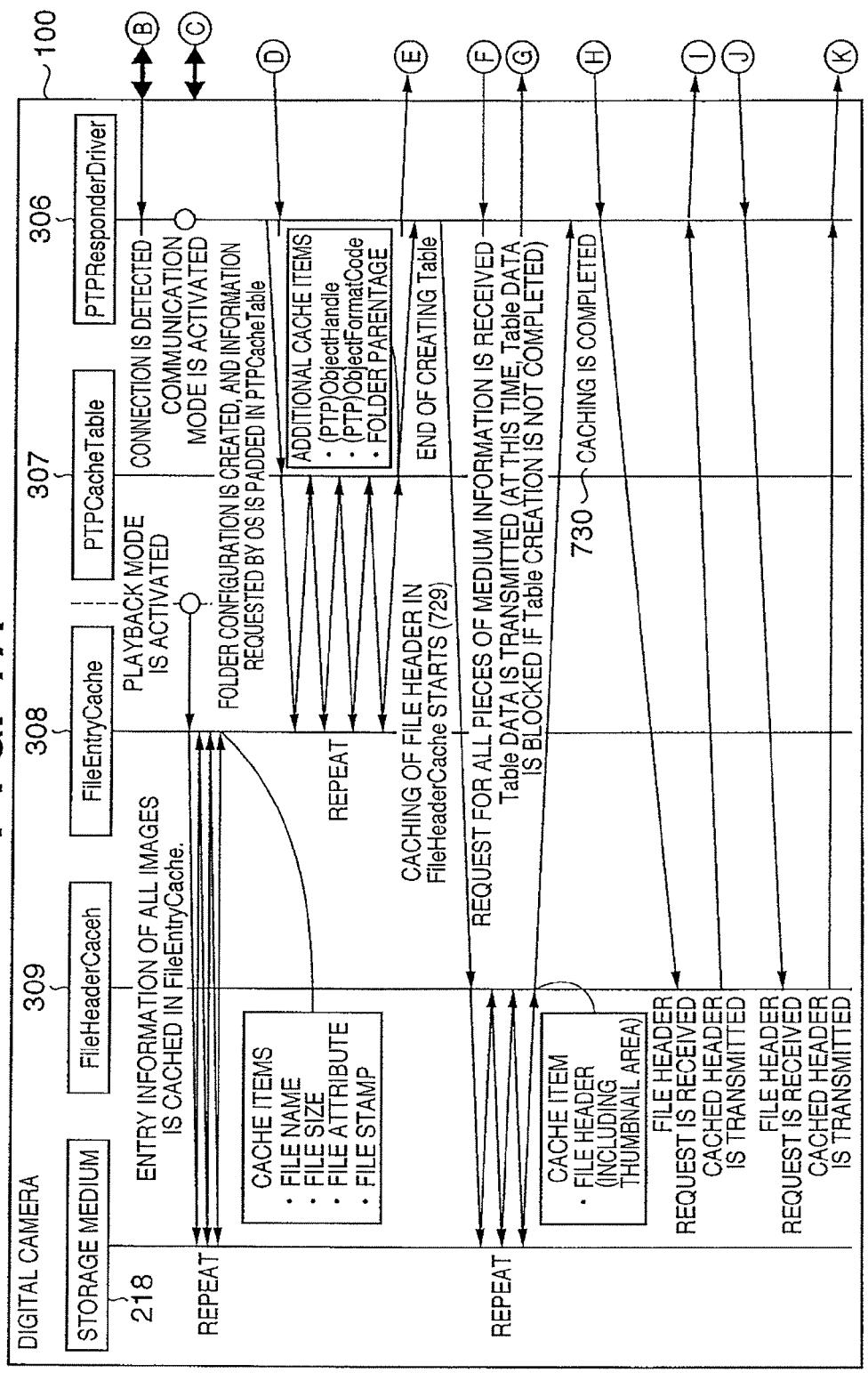

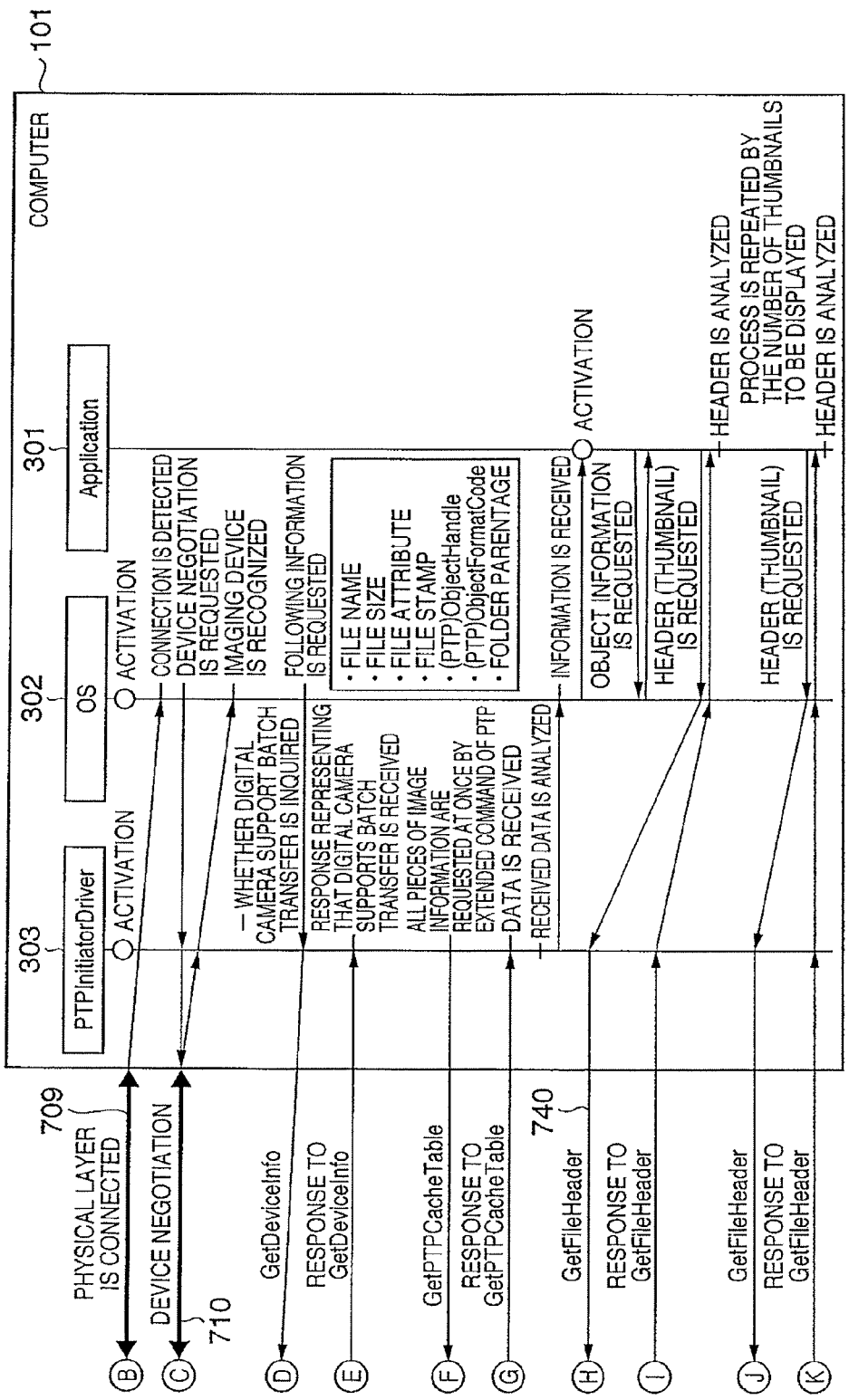

ELECTRONIC APPARATUS, CONTROL METHOD AND COMPUTER READABLE MEDIUM FOR TRANSMITTING THUMBNAIL DATA TO AN EXTERNAL APPARATUS

TECHNICAL FIELD

The present invention relates to a technique of shortening the response time of an electronic apparatus, such as an electronic camera, capable of communicating with an information processing apparatus, such as a computer, and improving the usability of the information processing apparatus when the information processing apparatus requests data stored in the storage medium of the electronic apparatus.

BACKGROUND ART

An image photographed by a digital camera is generally stored as a file in an auxiliary storage device such as a CF (Compact Flash® memory) mounted in the digital camera. In order to capture the image, the digital camera is generally connected to a computer, a host application is activated in the computer, and the image is transferred.

In general, an application displays reduced images (thumbnail images) as a list of images stored in the auxiliary storage device of the digital camera. The user selects a desired one of the thumbnail images to capture an image file corresponding to the selected thumbnail image into the computer. The image file is displayed on the display screen of the computer or saved in the auxiliary storage device of the computer.

According to an image file format "Exif-JPEG", which is generally employed in digital cameras, thumbnail images are stored in the same image file as that of main image data. In the above case, when a list is displayed, an area containing thumbnail image data out of the image file is transferred from the digital camera to the computer, and the entire image file need not be transferred to the computer. Hence, the processing speed is much higher than that in a case where the entire file is transferred to display thumbnail images.

For example, Japanese Patent Laid-Open No. 10-084473 discloses the following technique. That is, the transmitting side creates reduced images by reducing stored original images, and transmits image data of the reduced images to the receiving side. The receiving side displays a list of the received reduced images. Image data of original images corresponding to one or a plurality of reduced images selected from the list are transmitted from the transmitting side to the receiving side.

Recently, as the auxiliary storage devices mounted in a digital camera increase in capacity, the number of image files stored in the auxiliary storage device also increases. Transfer of only reduced images takes a long time when the reduced images of all images stored in the auxiliary storage device are transferred. A long transfer time degrades usability in, e.g., displaying a list of thumbnail images.

DISCLOSURE OF INVENTION

The present invention has been made to overcome conventional drawbacks, and has as its object to shorten the response time of an electronic apparatus, such as an electronic camera capable of communicating with an information processing apparatus such as a computer, and improve the usability of the information processing apparatus when the information processing apparatus requests data stored in the storage medium of the electronic apparatus.

To solve the above problems and achieve the above object, according to the first aspect of the present invention, there is provided an electronic apparatus which has a main storage device and an auxiliary storage device, that is connected to an external apparatus, and can transmit/receive data to/from the external apparatus. The data to be requested by the external apparatus is loaded in advance from the auxiliary storage device to the main storage device before the external apparatus requests the data.

According to the second aspect of the present invention, there is provided a method of controlling an electronic apparatus which has a main storage device and an auxiliary storage device, that is connected to an external apparatus, and can transmit/receive data to/from the external apparatus, which performs a control operation to load in advance data to be requested by the external apparatus from the auxiliary storage device to the main storage device before the external apparatus requests the data.

The electronic apparatus control method according to the present invention is characterized in that after connection to the external apparatus is established, data to be requested by the external apparatus is controlled to be loaded in advance from the auxiliary storage device to the main storage device before the external apparatus requests the data.

According to the third aspect of the present invention, a program causes a computer to execute the control method.

According to the fourth aspect of the present invention, a storage medium computer-readably stores the program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF DRAWINGS

FIGS. 7A and 7B are sequence charts showing operations of the digital camera and computer according to the embodiment of the present invention.

BEST MODE FOR CARRYING OUT THE INVENTION

A preferred embodiment of the present invention will be described below.

The time taken to transfer to a computer the reduced images of images stored in the auxiliary storage device of a digital camera is roughly divided into two periods:

(1) a read time taken to read out a reduced image area in an image file from the auxiliary storage device, and (2) a data transfer time taken to transfer the reduced image area to the computer.

The embodiment of the present invention gives attention to the read time. When a digital camera is connected to a computer, the reduced image area is read out from the auxiliary storage device of the digital camera and stored in a main storage device such as a RAM in advance before an application requests the reduced image area. When the computer requests transfer of the reduced image area, the digital camera sends back the reduced image data loaded in the main storage device.

A system according to the embodiment is roughly comprised of an electronic apparatus (e.g., a digital camera) having an auxiliary storage means and main storage means for recording photographed image data in a file, an information processing apparatus (e.g., a computer) which can connect the electronic apparatus, and application software which runs in the information processing apparatus.

The embodiment of the present invention will be described in detail.

The embodiment implements high-speed list display of reduced images (thumbnail images) in an application by executing loading of thumbnail data to the main storage device until the application requests thumbnail data of the digital camera after the digital camera and computer are connected by PTP (Picture Transfer Protocol) communication.

Figure 1:
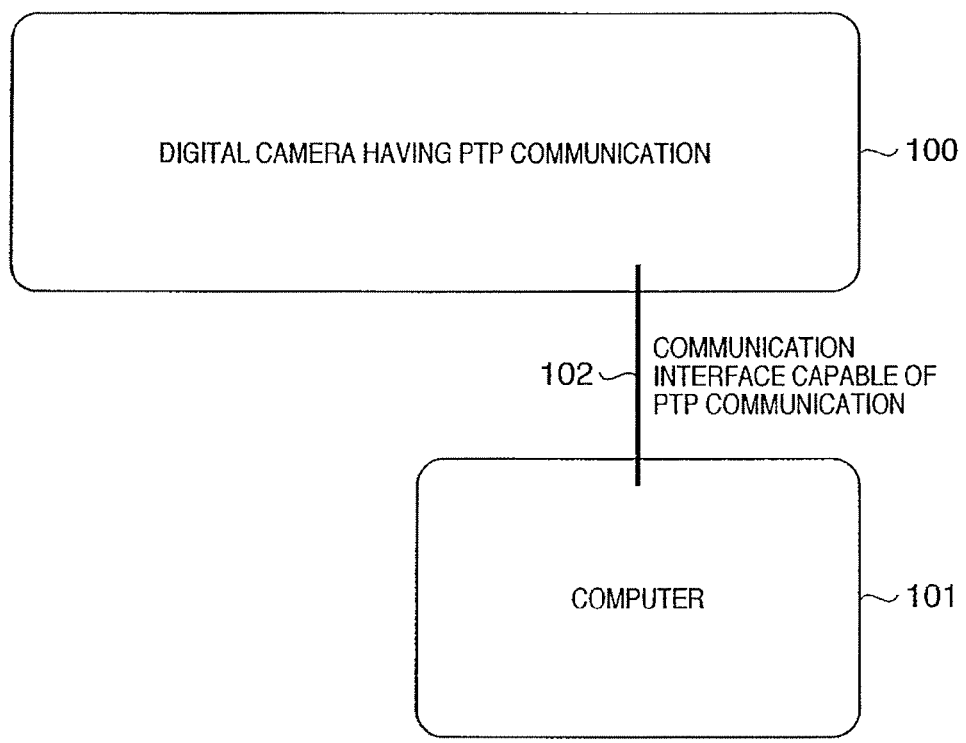
FIG. 1 is a block diagram showing a system having a digital camera and computer according to an embodiment of the present invention.

As shown in FIG. 1, the system according to the embodiment comprises a digital camera 100 having a PTP communication function, and a computer 101 capable of PTP communication. The digital camera 100 and computer 101 can communicate with each other via a communication interface 102 capable of PTP communication. The digital camera 100 detects connection to the computer 101 via the communication interface 102, and changes to a communication mode. A previous mode is a playback mode. In the computer, an application and driver (including an OS function) capable of PTP communication are installed.

Figure 2A:
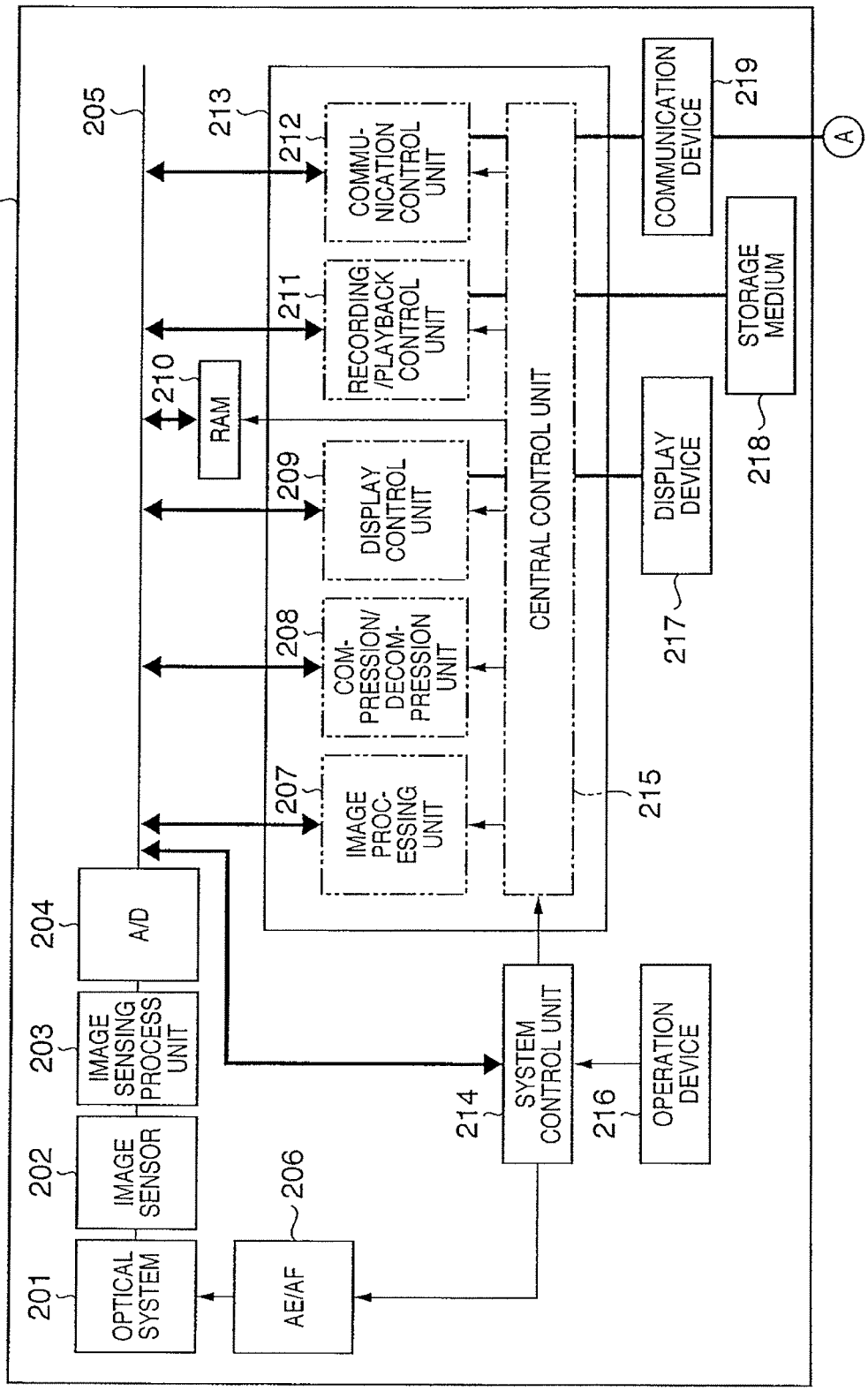
FIGS. 2A and 2B are functional block diagrams showing the system having the digital camera and computer according to the embodiment of the present invention.
Figure 2B:
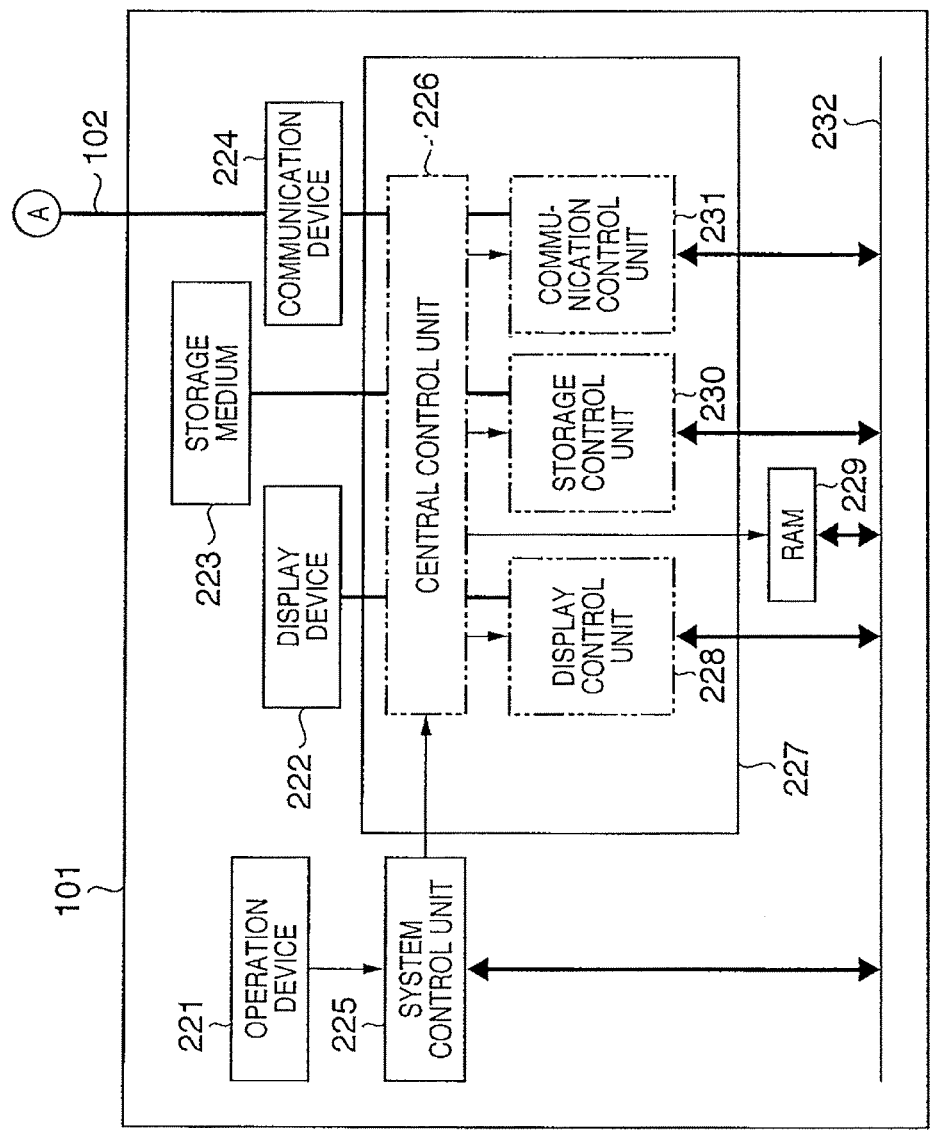

FIGS. 2A and 2B are block diagrams showing the system having the digital camera 100 and computer 101 in FIG. 1.

Reference numeral 201 denotes an optical system. A beam from an object is formed into an image via the optical system 201, and the image is held as charges by an image sensor 202. Charges stored in the image sensor 202 are converted into an image signal by an image sensing process unit 203. A signal output from the image sensing process unit 203 is converted into a digital signal via an A/D converter 204, and the digital signal is saved in a RAM 210 via a data bus 205.

A central processing unit 213 is roughly made up of six units: an image processing unit 207 (for white balance, sharpness, softening, color balance, level adjustment, and the like), a compression/decompression unit 208 (for JPEG decompression and the like), a display control unit 209 (for rendering of a UI (User Interface) on a display device 217), a recording/playback control unit 211 (for I/O control of a storage medium 218), a communication control unit 212 (for I/O control of data to a communication device 219), and a central control unit 215 (for supervision of these control units).

A system control unit 214 is connected to the data bus 205, and controls operation by the user via an operation device 216. The display device 217 displays a rendering UI requested by the display control unit 209. The storage medium 218 stores via the recording/playback control unit 211 an image (JPEG image or the like) saved in the RAM 210. The storage medium 218 may be a detachable medium or a built-in storage medium of the apparatus, and can hold the storage even when the digital camera is OFF. In the embodiment, a JPEG image file stored in the storage medium complies with the DCF standard, and stores thumbnail data at the header of the file. The communication device 219 may be of a wireless or wired type and of a detachable or undetachable type. The communication control unit 212 can communicate by PTP.

An operation device 221 of the computer 101 includes a keyboard and mouse, and the operation of the operation device 221 is controlled by a system control unit 225. A display device 222 is an output monitor, and outputs a UI rendered by a display control unit 228. A RAM 229 is a nonvolatile memory which stores the OS of the computer and a PTP-compatible application (including an OS). A storage medium 223 inputs/outputs data in accordance with a data request from a storage control unit 230, and is a nonvolatile storage device. The storage medium 223 stores applications corresponding to the OS and PTP. A communication device 224 can be connected to the communication interface 102, and inputs/outputs data under the control of a communication control unit 231. The communication device 224 may be of a wireless or wired type and of a detachable or undetachable type. A central processing unit 227 is made up of the display control unit 228, the storage control unit 230, the communication control unit 231, and a central control unit 226 (e.g., for supervision of these control units). A data bus 232 is connected to the system control unit 225, display control unit 228, RAM 229, storage control unit 230, and communication control unit 231.

Figure 3:
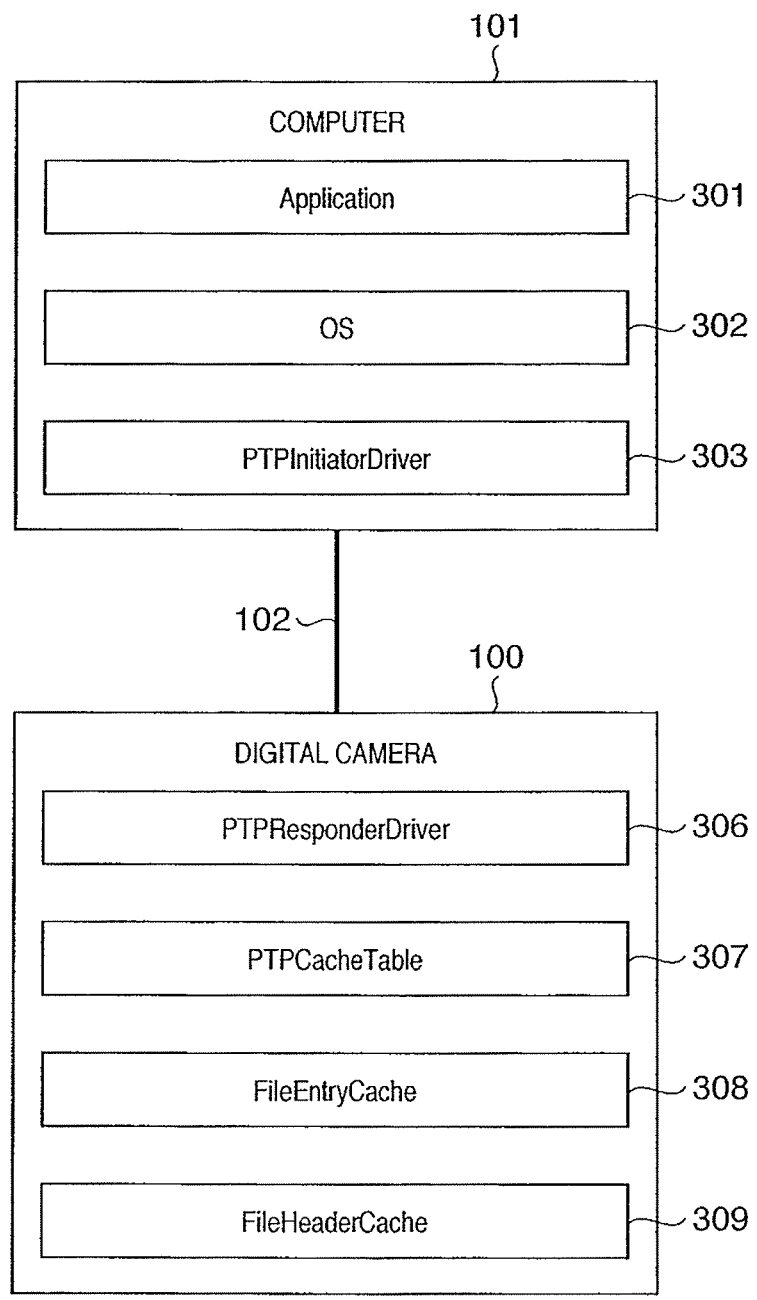
FIG. 3 is a block diagram showing the main module configuration of the system having the digital camera and computer according to the embodiment of the present invention.

FIG. 3 is a block diagram showing a main module configuration when the computer 101 and the digital camera 100 are connected via the communication interface 102.

An application 301 is a digital camera application which runs in the computer. The application 301 is registered in advance in an OS 302, and may be activated automatically by using the connection of the digital camera as a trigger or activated by user operation. The embodiment assumes that the application 301 is mainly activated when the application 301 is notified by the OS 302 that the digital camera 100 has been connected, and the application 301 displays a list of the reduced images of images stored in the digital camera. For this purpose, the application 301 supports PTP. If the OS 302 establishes connection to the digital camera 100, the application 301 can access the digital camera 100.

The OS 302 is the operating system of the computer 101. The embodiment assumes an OS (e.g., Windows® available from Microsoft) having a function capable of interpreting PTP communication, or an OS capable of PTP communication upon installing a driver. The OS 302 also has a function of recognizing a device capable of PTP communication, and acquiring/managing multimedia information in the digital camera 100. After all pieces of information are acquired, the OS 302 can connect the application and digital camera, and transfer a device handle in response to a request from the application. The embodiment assumes a setting which automatically activates the application 301 upon acquisition of all pieces of information.

A PTPInitiatorDriver 303 is installed in the OS 302, and loaded in response to a request from the OS.

The communication interface 102 can communicate by PTP, and may be of a wireless or wired type and of a detachable or undetachable type as far as PTP communication is possible.

The digital camera 100 can communicate by PTP, and incorporates a PTPResponderDriver 306, PTPCacheTable 307, FileEntryCache 308, and FileHeaderCache 309.

The PTPResponderDriver 306 is assumed to be a PTP responder driver installed in the digital camera 100.

The PTPCacheTable 307 is a cache table for information requested by PTP. Information which has been used once can be acquired by referring to the PTPCacheTable 307 as far as cache matching is guaranteed. The PTPCacheTable 307 is created in the RAM of the digital camera 100. In general, access to a RAM is higher in speed than access to a storage medium.

High-speed access can be realized by creating a cache in the RAM, instead of directly accessing a storage medium and analyzing information. In the embodiment, the cache structure is arbitrary.

The FileEntryCache 308 caches entry information of a file, i.e., items written in the file entry (e.g., file name, file size, attribute, creation date and time, update date and time, and access date and time). The FileEntryCache 308 can be referred to as far as cache matching is guaranteed, similar to the PTPCacheTable 307, and thus high-speed access can be realized.

The FileHeaderCache 309 caches the header area of an image file. The digital camera according to the embodiment generates a DCF-compatible Exif-JPEG file, and the header area also stores thumbnail data. The FileHeaderCache 309 can be referred to as far as cache matching is guaranteed, similar to the PTPCacheTable 307, and thus high-speed access can be realized.

Figure 4:
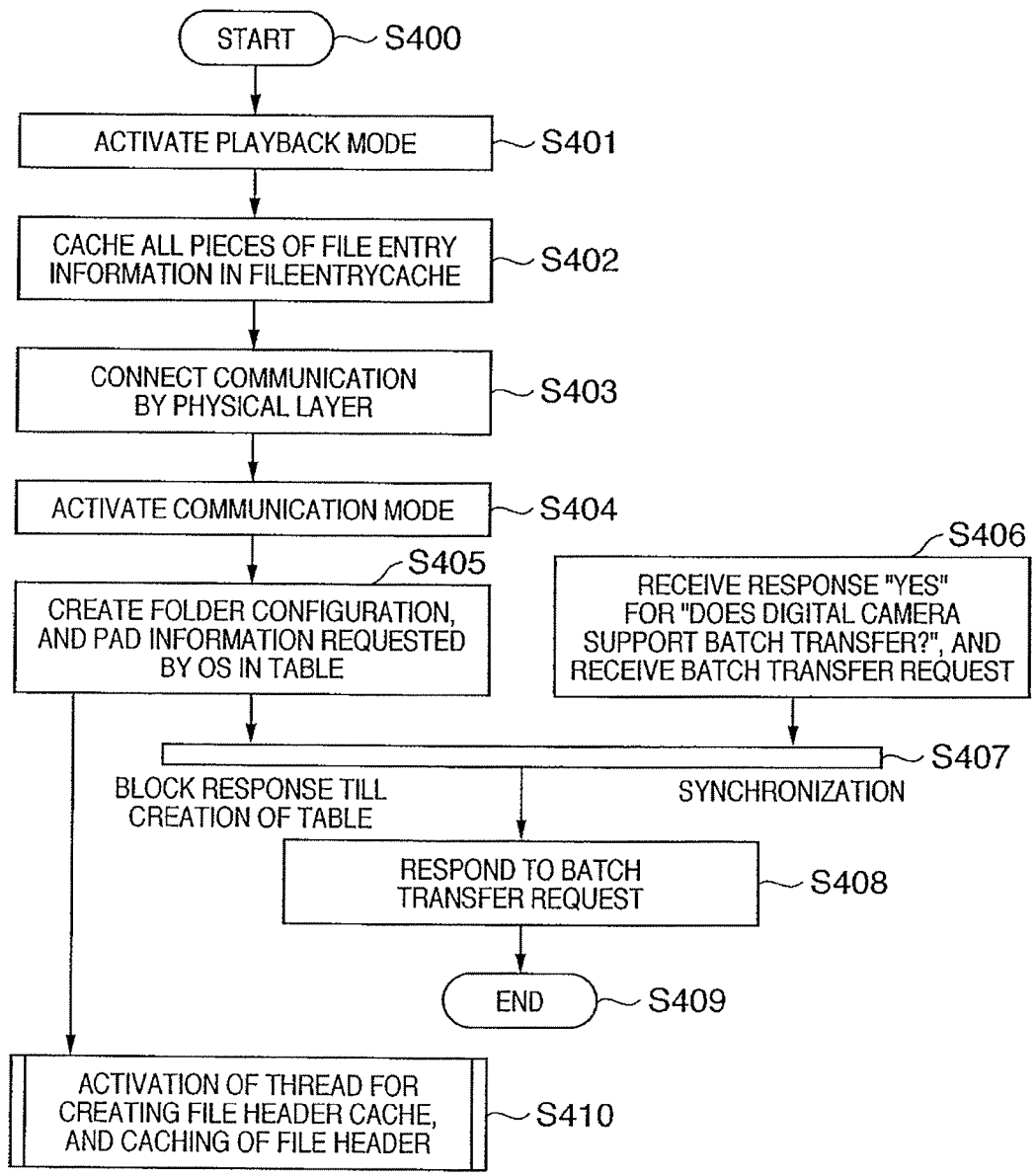
FIG. 4 is a flowchart showing operation of the digital camera according to the embodiment of the present invention.

FIG. 4 is a flowchart showing a process performed by the digital camera 100 until the OS 302 notifies the application 301 of activation after detecting connection of the digital camera 100 to the computer 101 via the communication interface 102.

At the start (step S400), the digital camera is activated. After start S400, the digital camera 100 is activated in the playback mode (step S401), and caches the file entries of all pieces of medium information in the FileEntryCache 308 (step S402). At this time, the order of media to be cached is arbitrary. The digital camera 100 is connected to the computer via the communication interface 102 (step S403). At this time, the digital camera 100 detects connection of communication by the physical layer, and changes to the communication mode (step S404).

In the communication mode, the digital camera 100 creates a folder configuration on the basis of data in the FileEntryCache 308, and creates the PTPCacheTable 307 (step S405). At this time, the table is created in consideration of medium information which is to be requested by the OS 302, and a folder configuration which is requested by the OS 302. More specifically, the PTPCacheTable 307 is created by creating an ObjectHandle and ObjectFormatCode which are necessary as PTP information in addition to information in the FileEntryCache 308 in order to satisfy multimedia information requested by the OS 302. Since no storage medium need be accessed, the process can be completed at a high speed.

Irrespectively of this timing, the computer inquires whether the digital camera 100 supports a batch transfer operation as an extended operation of PTP. Since the digital camera 100 according to the embodiment supports a batch transfer operation, it sends back a response to this effect. Note that a batch transfer directly transfers all pieces of multimedia information in the PTPCacheTable. The PTPInitiatorDriver which runs in the computer analyzes the received information of the PTPCacheTable, and executes a process.

If step S405 ends when the computer 101 requests batch transfer (step S406), the digital camera 100 responds to batch transfer (step S408); otherwise, the digital camera 100 blocks the response till the end of step S405 (step S407). In the process of step S408, the digital camera 100 transfers all pieces of multimedia information in the PTPCacheTable. At this time, the PTPCacheTable may be transferred by a fixed size or a variable length size corresponding to the number of PTP objects. In the process of FIG. 4, the communication count is only one. However, when the data size of an operation performed in a batch transfer is a variable length, the computer does not know the size to be ensured and prepared. Thus, redundancy must be given so that an operation of inquiring the size in advance is added, or the version is acquired to change the structure padded in the FileEntryCache 308 in accordance with a change in information requested by the OS 302. Even considering this method, all pieces of multimedia information can be transferred by several communication operations.

After the end of the process in step S405, another thread is activated in the digital camera 100, and creation of the FileHeaderCache 309 starts (step S418). In this case, the header of an image file stored in the storage medium 218 is loaded so that the header size is a predetermined size, and padded in the FileHeaderCache 309. Assume that the header size of a file to be loaded and the size of the FileHeaderCache 309 are determined in advance. In the embodiment, the header size of a file to be loaded is 10 kbytes, and the size of the FileHeaderCache 309 is 10,000 kbytes, that is, the file headers of 1,000 image files can be stored in the FileHeaderCache 309. These sizes may be changed in accordance with an image file stored in a storage medium and the number of image files.

If the digital camera 100 receives a header information transfer request from the computer 101 and the header of a desired file is stored in the FileHeaderCache 309, the digital camera 100 can quickly send back the header information to the computer without accessing the storage medium. As a result, the application 301 can quickly acquire file header information containing thumbnail data, and display a list of thumbnails at a high speed.

Note that the FileHeaderCache 309 can hold only 1,000 images. When more than 1,000 images exist, the storage medium must be accessed to acquire the file headers of images which exceed 1,000 images, and the response time becomes as long as the conventional response time. However, 1,000 images are sufficient for practical use, and in addition, the FileHeaderCache 309 is created in the RAM of the digital camera 100. For a digital camera having a satisfactory main storage capacity, the FileHeaderCache 309 for a larger number of image files can be prepared. In this case, more than 1,000 images can be acquired at a high speed.

The FileHeaderCache 309 is not a general FIFO memory and is not deleted from the cache even after it is referred to once. Instead, only a corresponding file is deleted.

Figure 5:
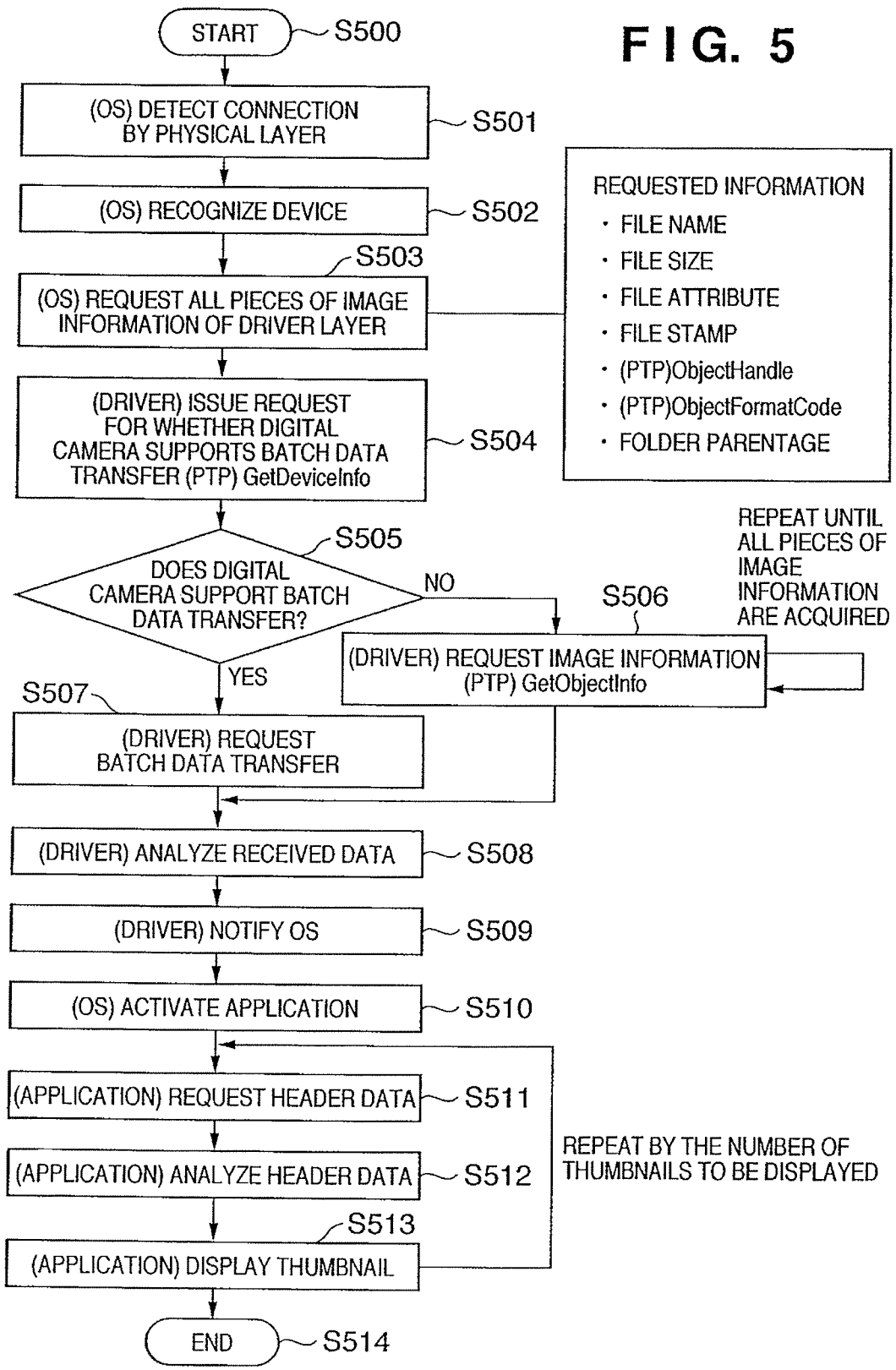
FIG. 5 is a flowchart showing operation of an application according to the embodiment of the present invention.

FIG. 5 is a flowchart showing a process performed by the computer until the OS 302 notifies the application 301 of activation and the application 301 displays a list of thumbnail images after detecting connection of the computer 101 to the digital camera 100 via the communication interface 102.

Start (step S500) represents a state in which the computer runs.

In response to connection via the communication interface 102, the computer detects connection of the physical layer (step S501). The OS 302 recognizes a device connected on the basis of data on a device which was connected (step S502). Assume that the PTP-compatible digital camera 100 is connected at least once, and its driver is installed. The OS 302 requests, of the PTPInitiatorDriver 303, all pieces of multimedia information of the digital camera 100 and their folder configurations (step S503). At this time, a file name, a file size, a file attribute, a file creation date and time, a PTP ObjectHandle, a PTP ObjectFormatCode, and a folder configuration requested by the OS 302 are requested. Upon reception of the request from the OS 302, the PTPInitiatorDriver 303 inquires whether the digital camera 100 supports the batch data transfer function (step S504). In the embodiment, the PTPInitiatorDriver 303 makes an inquiry by using a GetDeviceInfo of PTP operation. If the digital camera 100 supports the batch data transfer function as a result of the inquiry (YES in step S505), the PTPInitiatorDriver 303 requests batch data transfer (step S507). Upon reception of data, the PTPInitiatorDriver 303 analyzes data in accordance with a configuration requested by the OS 302 on the basis of the received data, and responds to the OS 302 (step S509).

If NO in the process of step S505, the PTPInitiatorDriver 303 acquires all pieces of multimedia information in the digital camera 100 by using, e.g., GetStorageIDs, GetStorageInfo, GetObjectHandles, and GetObjectInfo of PTP operation. After that, the flow shifts to the process of step S508.

Upon reception of a response to the request to the PTPInitiatorDriver 303, the OS 302 activates the application 301 (step S510). The application 301 is activated and requests header data of an image file (step S511). Upon reception of the header data, the application 301 analyzes the data, extracts thumbnail data (step S512), and displays the thumbnail data on the display screen (step S513). This process is repeated by the number of thumbnails to be displayed.

FIGS. 7A and 7B are sequence charts until the OS 302 activates the application 301 after the digital camera 100 and computer 101 are connected. This sequence chart corresponds to the module configuration in FIG. 3.

When connection of the physical layer is established via the communication interface 102 (709), the digital camera 100 and computer 101 detect the connection. Before or after connection of the physical layer, the digital camera 100 enters the playback mode once (in the digital camera 100 of the embodiment, the playback mode always precedes the communication mode). In the playback mode, all pieces of file entry information are written and cached in the FileEntryCache 308. Created cache items are a file name, a file size, a file attribute, and a file creation date and time, and the file caching order is not particularly specified.

After the communication mode is activated, another thread is set upon activation of the communication mode, and information requested by the OS 302 is created in the PTPCacheTable 307 in advance. Since the PTPCacheTable 307 is created on the basis of information of the FileEntryCache 308, no access to the storage medium 218 occurs, and the process can be done at a high speed.

While another thread is activated, connection of the physical layer is done in the computer 101 (709), and then the OS 302 detects the connection and starts negotiation with a device (710). At the end of the negotiation, the OS 302 recognizes an imaging device, and requests the device information of the PTPInitiatorDriver 303. At this time, a file name, a file size, a file attribute, a file creation date and time, a PTP ObjectHandle, a PTP ObjectFormatCode, and a folder configuration are requested. Upon reception of the request from the OS 302, the PTPInitiatorDriver 303 issues a GetDeviceInfo operation command, and sends the inquiry to the digital camera 100 in order to know whether the digital camera 100 supports batch data transfer. Upon reception of the request, the PTPResponderDriver 306 of the digital camera sends back information indicating that the digital camera supports batch transfer.

The term "batch transfer" refers to a function of directly transferring information held in the PTPCacheTable 307 to a PC.

The PTPInitiatorDriver 303 of the computer then executes a batch transfer operation GetPTPCacheTable as an extended operation of PTP.

The digital camera 100 receives the GetPTPCacheTable, and determines whether the PTPCacheTable 307 can meet the request from the OS 302. If so, the digital camera 100 instantaneously responds; otherwise, the digital camera 100 blocks the response until creation of the table is completed.

Upon the reception of a response to the GetPTPCacheTable, the PTPInitiatorDriver 303 analyzes the received table information, analyzes the multimedia object configuration in the camera, changes it into a configuration requested by the OS 302, and sends back the changed configuration to the OS 302. Upon reception of the information, the OS 302 activates the application 301.

Immediately after the PTPCacheTable is created, the digital camera 100 starts creating the FileHeaderCache 309 (729).

When file header information acquisition operation GetFileHeader is executed upon the completion of creating the FileHeaderCache 309, the digital camera 100 can send back information in the FileHeaderCache 309 as a response. In the embodiment, information requested by GetFileHeader is read out in advance from a storage medium to the RAM (FileHeaderCache 309) by using an interval until the GetFileHeader operation is executed upon the completion of creating the PTPCacheTable. With this setting, the digital camera 100 can immediately respond to a GetFileCache because data can be loaded from the RAM more quickly than from the storage medium.

In FIGS. 7A and 7B, when many image files exist, the header acquisition request GetFileHeader operation from the application may be executed before the FileHeaderCache 309 caches all images. This corresponds to a case wherein a GetFileCache 740 is executed before caching completion 730 in FIG. 7. In this case, the GetFileCache 740 may be ended with an error or kept waiting till caching completion 730. In this state, however, the application cannot display any thumbnail, resulting in poor usability. In order to avoid this, when the header acquisition request GetFileHeader is executed while the FileHeaderCache 309 is created, i.e., the process in step S410 of FIG. 4 is executed, the digital camera according to the embodiment interrupts a thread which executes caching, suspends the caching process, performs an interrupt process, and preferentially responds to the GetFileHeader.

Figure 6:
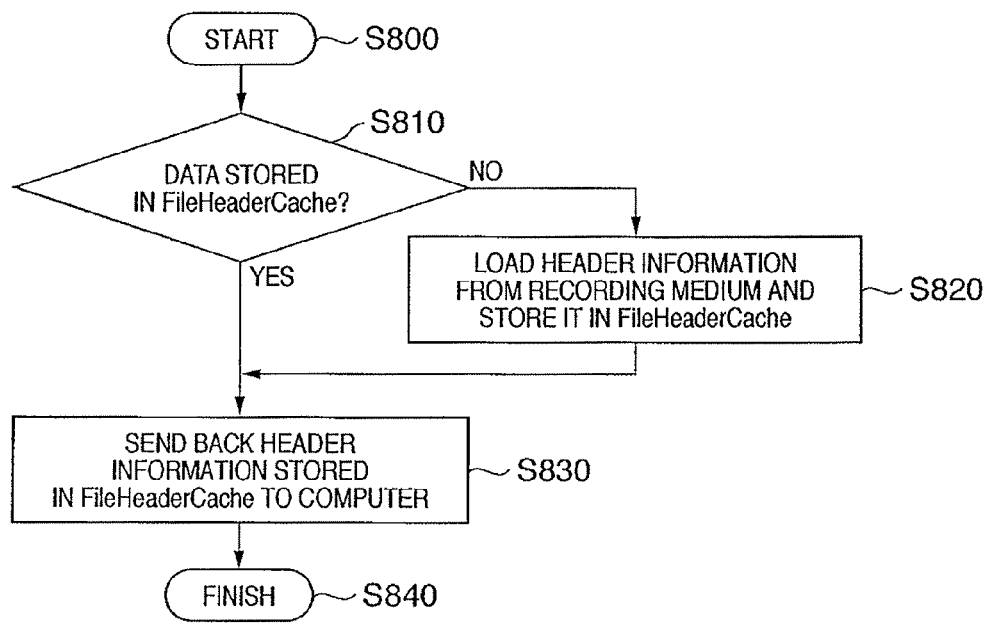
FIG. 6 is a flowchart showing operation of the digital camera according to the embodiment of the present invention.

FIG. 6 is a flowchart showing the interrupt process.

Start (step S800) represents the start of the interrupt process. In step S810, it is determined whether a file header requested by a GetFileHeader has been cached in the FileHeaderCache 309. If the requested file header has already been cached, the data cached in the FileHeaderCache 309 is sent back as a response to the GetFileHeader. If no requested file header has been cached, a desired file header is loaded from a recording medium and cached in the FileHeaderCache 309 in step S820. In step S830, the cached data is sent back as a response to the GetFileHeader.

Figure 8:
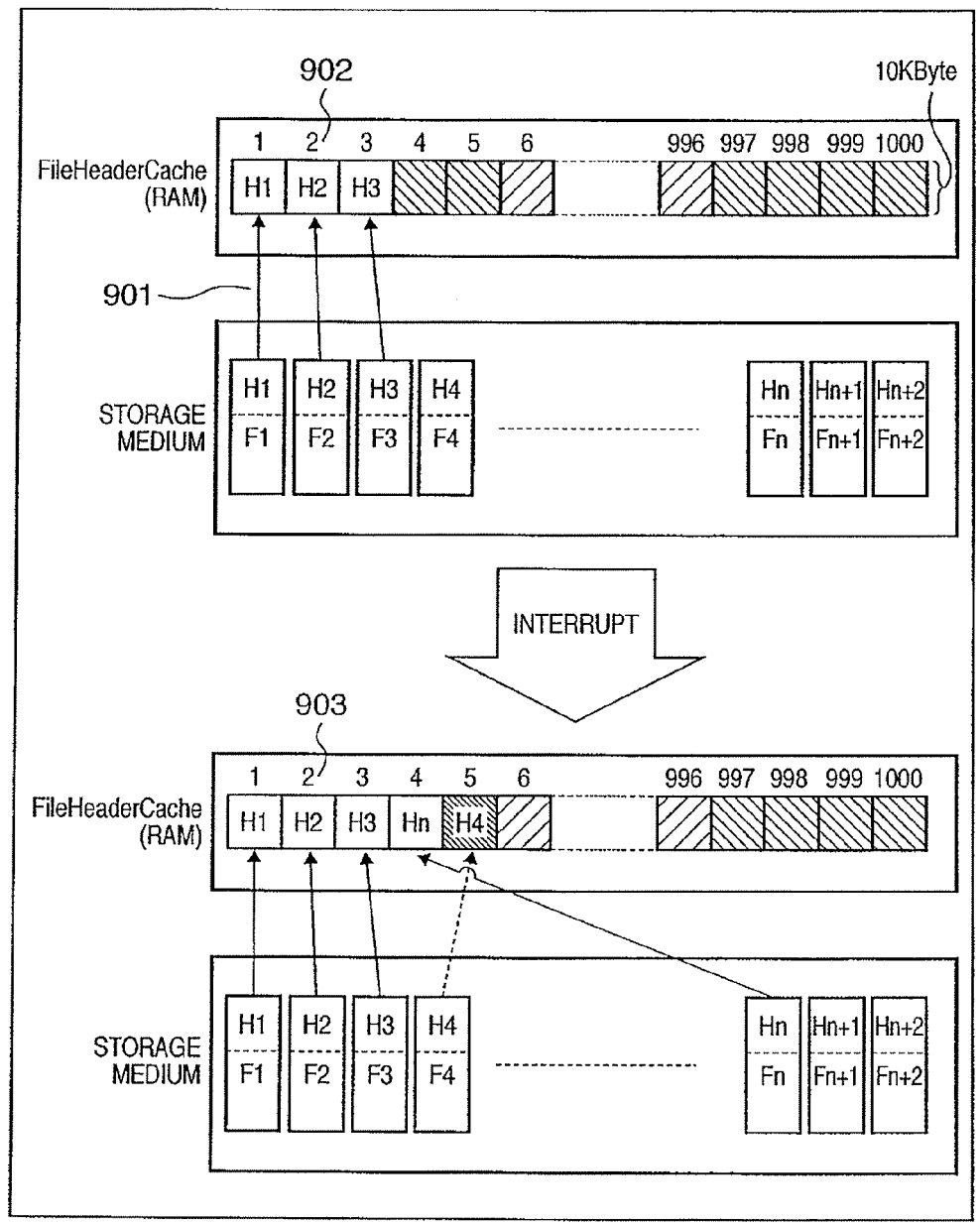
FIG. 8 is a conceptual view for explaining caching of a file header according to the embodiment of the present invention.

FIG. 8 is a conceptual view for explaining the state of the FileHeaderCache 309 at this time.

When a thread for creating the FileHeaderCache 309 is activated, the headers of image files stored in a storage medium are sequentially stored in the FileHeaderCache 309. In the embodiment, the image files are stored in the order of the file names of files stored in the storage medium. However, the present invention is not limited to this. In the state 902 of FIG. 8, up to files F1, F2, and F3 have been processed, and the FileHeaderCache 309 stores headers H1, H2, and H3 corresponding to the respective files. In general, a file to be processed next is a file F4, and the FileHeaderCache 309 is to store a header H4 of the file F4. However, when the computer executes a GetFileHeader and a requested file is Fn, a header Hn of the file Fn does not exist in the FileHeaderCache 309. Hence, a process to Fn is executed, the header Hn of the file Fn is stored in the FileHeaderCache 309, and the data is sent back as a response to the GetFileHeader. After the interrupt process ends, the thread for creating the FileHeaderCache 309 continues its process to process the file F4. As a result, the state of the FileHeaderCache 309 changes to a state 903.

As described above, according to the embodiment, immediately after connection between the digital camera and the computer is established, file headers are read out from the storage medium and cached. In many cases, when the computer recognizes a device such as a digital camera, the OS or driver performs any process. Upon the completion of the process, an application which runs in the computer becomes accessible to the device. The embodiment gives attention to the time necessary for the OS or driver. During the time, in the digital camera, an area (file header) which stores thumbnail data expected to be requested by the application is read out from the storage medium and cached in the RAM. Generally from a comparison between read speeds from a storage medium and RAM, the read speed from the RAM is much higher. For these reasons, when the application requests thumbnail data of the digital camera, the digital camera can quickly send back data, and the application can display a list of thumbnails at a high speed.

As described in detail above, according to the embodiment, of a file stored in the auxiliary storage device of an electronic apparatus, a data area which is to be transferred in accordance with a request from an external apparatus connected to the electronic apparatus is cached in the main storage device in advance, thereby quickly meeting a data request from the external apparatus. Even when data transfer is requested during caching, the request can be quickly met by suspending caching by an interrupt process.

In the embodiment, capturing of thumbnail data to the main storage device is executed until the application requests thumbnail data of the digital camera after connection by PTP communication. However, capturing may be done before connection by PTP communication or during a process for connection as far as it is executed until the application requests thumbnail data of the digital camera.

The embodiment can shorten the response time of an electronic apparatus such as an electronic camera capable of communicating with an information processing apparatus such as a computer, and improve the usability of the information processing apparatus when the information processing apparatus requests data stored in the storage medium of the electronic apparatus.

OTHER EMBODIMENT

The object of the embodiment is also achieved when a storage medium (or a recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the present invention includes a case wherein an OS (Operating System) or the like running on the computer performs some or all of actual processes on the basis of the instructions of the program codes and thereby realizes the functions of the above-described embodiment.

Furthermore, the present invention includes a case wherein, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiment.

When the present invention is applied to the storage medium, the storage medium stores program codes corresponding to the above-described sequences.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2004-268711 filed on Sep. 15, 2004, the entire contents of which are hereby incorporated by reference herein.

The invention claimed is:
1. An electronic apparatus comprising:
a communication unit that transmits data to an external apparatus; and
a control unit that controls storing the data,
wherein said control unit controls said electronic apparatus to start storing fixed size partial data, which is less than all of the data included in a single file, from a first storage unit of the electronic apparatus to a second storage unit of the electronic apparatus before a transmission request is transmitted from the external apparatus after a connection between the electronic apparatus and the external apparatus is established, wherein the single file includes contents data and thumbnail data related to the contents data and is stored in the first storage unit of the electronic apparatus, wherein the fixed size partial data is a part of the data included in the single file stored in the first storage unit of the electronic apparatus, and wherein the second storage unit of the electronic apparatus is able to perform higher speed access than the first storage unit,
wherein a size of the fixed size partial data is a predetermined fixed size and said control unit controls said electronic apparatus to store the fixed size partial data from the first storage unit to the second storage unit, wherein each fixed size partial data corresponds to one of a plurality of files stored in the first storage unit and has the predetermined fixed size, and
wherein said control unit reads out the fixed size partial data of the file, which corresponds to the request, from the second storage unit in a case that the transmission request is transmitted from the external apparatus, and said communication unit transmits the fixed size partial data read out from the second storage unit to the external apparatus, the fixed size partial data including thumbnail data included in the file.

2. The electronic apparatus according to claim 1, wherein said control unit starts storing the fixed size partial data in the second storage unit before receiving the transmission request and after the connection with the external apparatus is established, wherein the transmission request is transmitted from the external apparatus after an application for displaying the fixed size partial data received from the electronic apparatus is started in the external apparatus.

3. The electronic apparatus according to claim 1, wherein the transmission request from the external apparatus is a request that requests header information of a specific file.

4. The electronic apparatus according to claim 1, wherein said control unit reads out the fixed size partial data from the first storage unit after the transmission request is transmitted from the external apparatus, in a case that the amount of the fixed size partial data stored in the second storage unit exceeds a predetermined value.

5. The electronic apparatus according to claim 1, wherein the control unit stores not-yet-stored fixed size partial data, which is requested by the external apparatus, in the second storage unit from the first storage unit, in a case that said control unit receives the transmission request from the external apparatus for the not-yet-stored data during a process in which said control unit has started storing the fixed size partial data in the second storage unit but has not stored the not-yet-stored fixed size partial data in the second storage unit, and wherein said communication unit transmits the fixed size partial data stored in the second storage unit including the not-yet-stored fixed size partial data that has now been stored in the second storage unit to the external apparatus.

6. The electronic apparatus according to claim 1, wherein the electronic apparatus is a digital camera and the external apparatus is a computer.

7. A control method of controlling an electronic apparatus that transmits data to an external apparatus, said method comprising the steps of:

starting storing fixed size partial data, which is less than all of the data included in a single file, from a first storage unit of the electronic apparatus to a second storage unit of the electronic apparatus before a transmission request is transmitted from the external apparatus after a connection between the electronic apparatus and the external apparatus is established, wherein the single file includes contents data and thumbnail data related to the contents data and is stored in the first storage unit of the electronic apparatus, wherein the fixed size partial data is a part of data included in the single file stored in the first storage unit of the electronic apparatus, and wherein the second storage unit of the electronic apparatus is able to perform higher speed access than the first storage unit;

reading out the fixed size partial data of the file, which corresponds to the transmission request, from the second storage unit in a case that the transmission request is transmitted from the external apparatus; and transmitting the fixed size partial data read out from the second storage unit to the external apparatus, wherein a size of the fixed size partial data is a predetermined fixed size and a control unit controls the electronic apparatus to store the fixed size partial data from the first storage unit to the second storage unit, wherein each fixed size partial data corresponds to one of a plurality of files stored in the first storage unit and has the predetermined fixed size, and wherein the fixed size partial data includes thumbnail data included in the file.

8. A non-transitory computer readable storage medium storing a program causing a computer to execute a control method of controlling an electronic apparatus that transmits/receives data to/from an external apparatus, said method comprising the steps of:

starting storing fixed size partial data, which is less than all of the data included in a single file, from a first storage unit of the electronic apparatus to a second storage unit of the electronic apparatus before a transmission request is transmitted from the external apparatus after a connection between the electronic apparatus and the external apparatus is established, wherein the single file includes contents data and thumbnail data related to the contents data and is stored in a first storage unit of the electronic apparatus, wherein the fixed size partial data is a part of data included in the single file stored in a first storage unit of the electronic apparatus, and wherein the second storage unit of the electronic apparatus is able to perform higher speed access than the first storage unit;

reading out the fixed size partial data of the file, which corresponds to the transmission request, from the second storage unit in a case that the transmission request is transmitted from the external apparatus; and transmitting the fixed size partial data read out from the second storage unit to the external apparatus, wherein a size of the fixed size partial data is a predetermined fixed size and a control unit controls the electronic apparatus to store the fixed size partial data from the first storage unit to the second storage unit, wherein each fixed size partial data corresponds to one of a plurality of files stored in the first storage unit and has the predetermined fixed size, and wherein the fixed size partial data includes thumbnail data included in the file.

* * * * *